INVENTORS
J. E. STORMENT
C. S. JONES
N. G. MILLER
BY Young & Quigg
ATTORNEYS

United States Patent Office 3,443,391
Patented May 13, 1969

3,443,391
WAX CRYSTALLIZATION EMPLOYING PROPANE REFRIGERANT
Joseph E. Storment, Charley S. Jones, and Norman G. Miller, Kansas City, Kans., assignors to Phillips Petroleum Company, a corporation of Delaware
Filed Sept. 26, 1966, Ser. No. 582,040
Int. Cl. B01d 9/02; C10g 43/02
U.S. Cl. 62—58    8 Claims This invention relates to the chilling of liquid mixtures. In one of its aspects, this invention relates to a process for crystallization of a component of a liquid mixture.

The term "liquid mixture," as used herein, is a fluid comprising component materials which are capable of separation under certain conditions of temperature and pressure.

The removal of crystalline materials, for example, wax, from a liquid mixture can be effected by chilling the total mixture to a temperature at which crystals form. Once the crystals form, the mixture can be filtered for separation. The removal of crystalline materials from a liquid mixture is often necessary to obtain an acceptable end product or to obtain different products from the same source material. For example, wax is removed from lubricating oil in order that the oil will remain fluid at low temperatures. Wax recovery is also desirable because the purified wax is in itself commercially marketable.

Accordingly, an object of this invention is to chill liquid mixtures.

Another object is to chill liquid mixtures while avoiding shock chilling.

Another object is to reduce the net refrigeration required to chill an amount of a liquid mixture.

Various other objects, advantages, and features of this invention will become apparent from the following written description, the drawings, and the claims.

Figure 1:
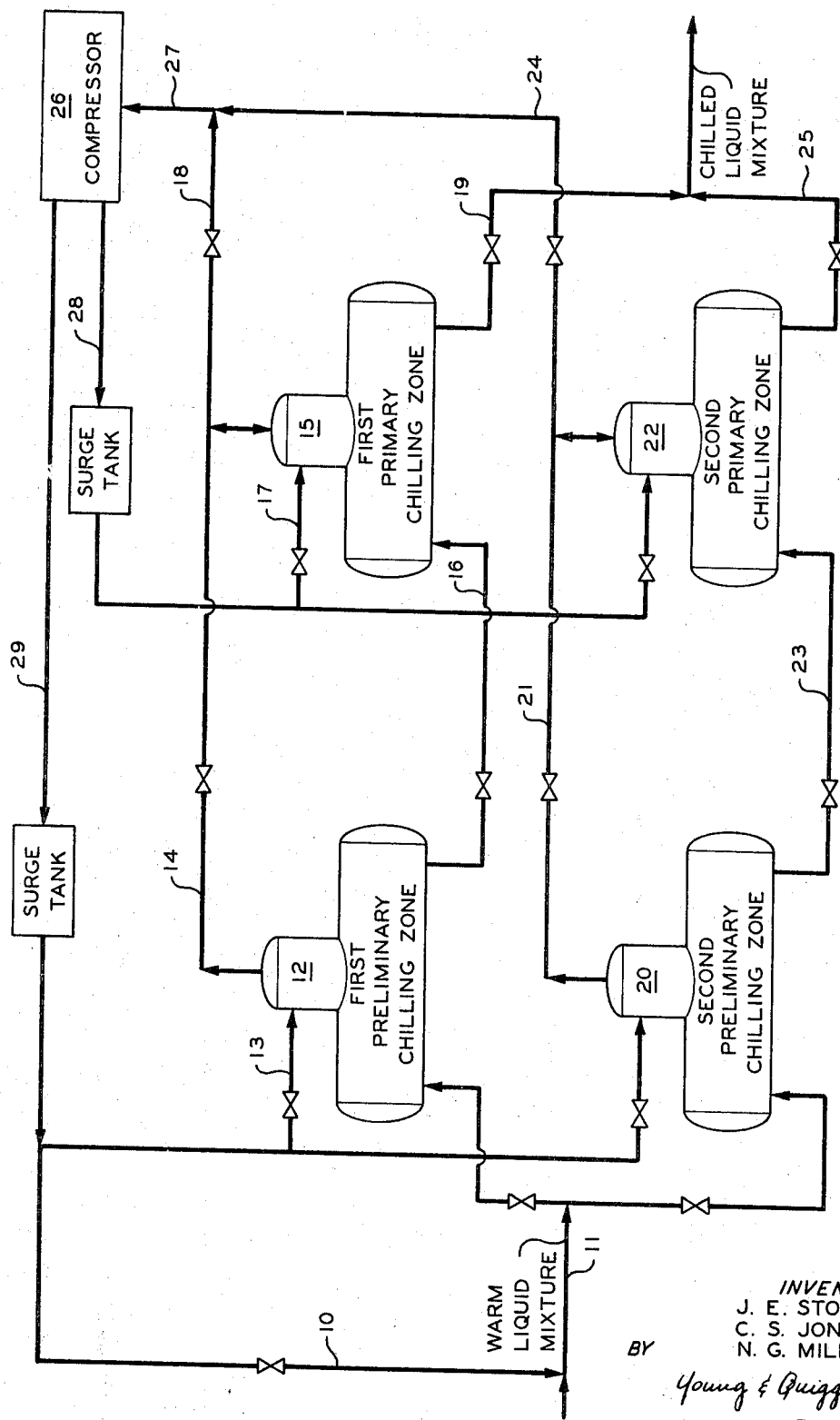

In the drawing, FIGURE 1 is a schematic representation of the process steps and apparatus.

Figure 2:
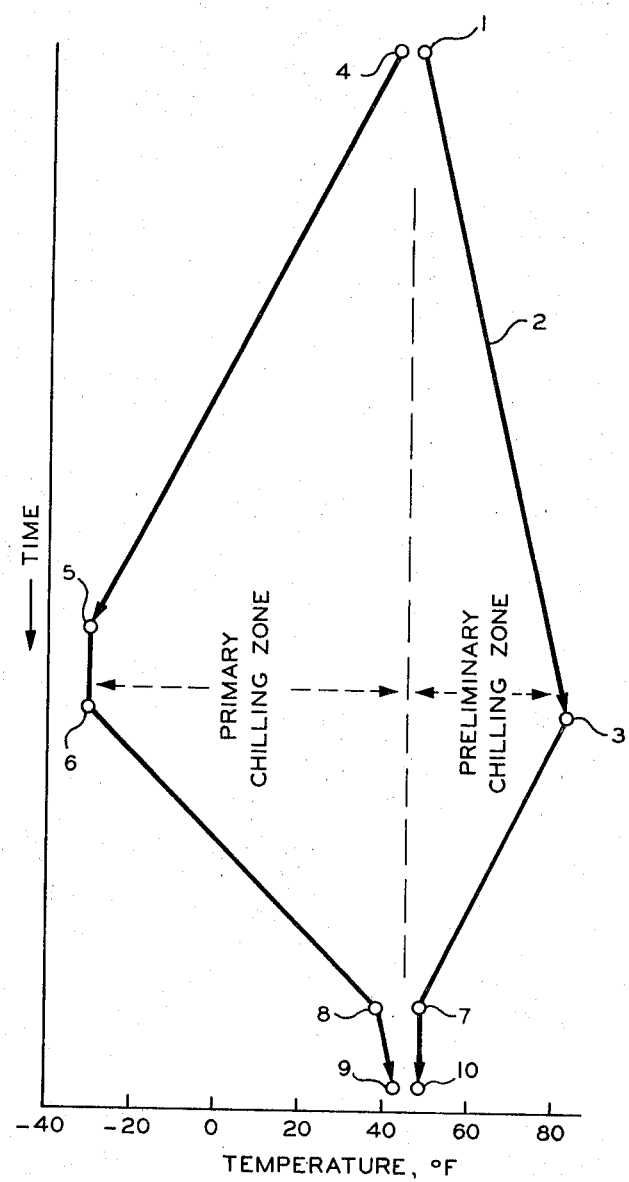

FIGURE 2 is a curve illustrating a typical time-temperature relationship of the process steps.

According to the invention, a liquid mixture is chilled by charging an amount of liquid mixture to a preliminary chilling zone, evaporating a portion of a volatile component of the mixture thereby chilling the liquid mixture to an intermediate temperature, transferring the vaporized volatile component from the preliminary chilling zone to a primary chilling zone thereby warming the primary chilling zone to a desired temperature, transferring the liquid mixture to the primary chilling zone, chilling the liquid mixture to a desired temperature in the primary chilling zone, removing the chilled liquid mixture from the primary chilling zone, and repeating the above steps in the preliminary chilling zone and primary chilling zone.

Warm liquid mixture can contain a volatile component or volatile component can be admixed with the liquid mixture before or during the charging of the preliminary chilling zone. The temperature of the preliminary chilling zone is maintained at a temperature which is related to the entry temperature of the warm liquid mixture in such a manner that shock chilling is avoided in the initial charging step. At the beginning of the preliminary cooling step of the cycle, the primary chilling zone is at a very low temperature since a batch of completely chilled liquid mixture had just been removed from the zone. Because of its low pressure and temperature, the primary chilling zone acts as a natural "heat sink" for component vapors from the higher pressure preliminary chilling zone. By accepting component vapors from the preliminary chilling zone, the primary chiller is warmed to a temperature at which the liquid mixture can be transferred without shock chilling.

When the liquid mixture is transferred to the primary chilling zone, this can be accomplished by any suitable method such as pumping. However, it is preferred to retain a pressure differential between the preliminary and primary chilling zones and to use this differential pressure to transfer the liquid from the preliminary chilling zone to the primary chilling zone.

In the primary chilling zone, the liquid mixture is cooled to the desired temperature by heat exchange with a refrigerant. Any suitable method, for example, liquid ammonia or Freon in a shell and tube heat exchanger, can be used to cool the liquid mixture. An advantageous method of effecting heat exchange is to mix a volatile liquid refrigerant with the liquid mixture and evaporate the refrigerant. A compressor can be used to draw off refrigerant vapor and repressure the vapor. The compressed vapor is condensed and recycled as the refrigerant. In some instances, the volatile component of the liquid mixture can be used as a refrigerant, thus permitting the use of a single compression system to recover volatile component and to provide refrigeration. Of course, if the liquid mixture contains a sufficient amount of volatile component so that the liquid can be chilled to the desired low temperature, the use of additional refrigerant can be eliminated. Once the desired low temperature is attained, the chilled liquid mixture is transferred to an accumulation zone and the cycle is repeated.

If desired, the process of this invention can be practiced using two pairs of chillers, thereby allowing continuous feed to the process. A first preliminary chilling zone and a first primary chilling zone can operate in combination with a second preliminary chilling zone and a second primary chilling zone so that the batch process continuously accepts the mixture to be cooled.

By the practice of the invention, very rapid cooling rates, in effect known as shock chilling, are avoided, thereby minimizing the resulting formation of fine crystals and their adverse effects on filter rates. For example, if a chilled liquid mixture is removed from a batch chiller to filter feed tank and the empty cold chiller refilled directly with a warm liquid mixture, severe chilling results. Also, by the practice of the present invention, the refrigeration needed to chill the steel in the chilling vessel is minimized.

Referring now to FIGURE 1, a warm liquid mixture, containing a volatile component, is charged under pressure through line 11 into first preliminary chilling zone 12. If desired, recycled volatile component can be introduced via line 10 and admixed with warm liquid mixture in line 11. Once first preliminary chiller 12 is filled and the desired pressure is attained, pressure is released and component vapors flow through line 14 into first primary chiller 15. Additional liquid volatile component can be added to the liquid mixture in first preliminary chiller 12 through line 13 if advantageous when chilling a particular liquid mixture. When the predetermined intermediate temperature is attained in zone 12 and the temperature necessary to prevent shock chilling in first primary chiller 15 is reached, the liquid mixture is transferred to zone 15 via line 16. Volatile liquid refrigerant, being of the same composition as the volatile component, is introduced through line 17 and mixed with the liquid mixture. Vapors are drawn off through line 18 until the liquid mixture is cooled to the desired temperature to accomplish a desired crystallization. Chilled liquid mixture containing a crystallized component is removed from primary chiller 15 via line 19.

While first preliminary chiller 12 is being charged, the liquid mixture in chiller 20 is being chilled, the vapor from second preliminary chiller 20 being drawn off through line 21 to second primary chiller 22. While first primary chiller 15 is being warmed by acting as a "heat sink," second primary chiller 22 is filled with the partially cooled liquid mixture via line 23 and chills the mixture, refrigerant vapors being drawn off through line 24. Chilled liquid mixture is removed from second primary chiller 22 through line 25 to an accumulation zone.

In this embodiment, the refrigerant is of the same composition as the volatile component of the liquid mixture, thus compressor 26 can provide the necessary pressures to both pair of chillers. Compressor 26 draws off vapor through line 27, condensing the vapors, and pressures the liquefied vapors through line 28 to primary chillers 15 and 22 as liquid refrigerant. A portion of the liquefied vapors can be discharged through line 29 to be used as a component of the liquid mixture.

The following example serves to further illustrate the invention.

*Example I*

In an example, utilizing the system illustrated in FIGURE 1, wax lube oil stock having a viscosity of 52 SUS at 210° F., a COC flash point at 460° F., a COC fire point at 510° F., and API gravity at 60° F. of 31, is mixed with liquid propane, the propane to oil volume ratio of the initial liquid mixture being 1.9 to one and the temperature of the propane-oil wax liquid being 100° F., and a volume of this liquid mixture is charged to the preliminary chiller which has a temperature of 50° F. After the liquid mixture is charged to the preliminary chilling vessel, the liquid mixture-vessel equilibrium temperature is 85° F. and pressure in the preliminary chilling vessel is 142 p.s.i.g.

Upon charging the preliminary chilling vessel, chilled liquid mixture has been removed from the primary chilling zone and the primary chilling zone is at a temperature of −30° F. and pressure of 5 p.s.i.g. Propane is evaporated from the propane-oil-wax mixture in the preliminary chilling vessel by releasing pressure to the primary chilling vessel. Propane evaporation is continued until the liquid mixture is at a temperature of 50° F. under a pressure of 76 p.s.i.g. and the primary chilling vessel is at 40° F. and 68 p.s.i.g. The differential pressure is utilized to transfer the liquid mixture from the preliminary chiller to the primary chiller.

Following the transfer, the primary chiller contains liquid mixture at a temperature of 44° F. under a pressure of 72 p.s.i.g. Liquid propane at 0° F. is added to the mixture and evaporated until the liquid mixture has a propane to oil volume ratio of 2.6 to 1 and is at a temperature of −30° F. The chilled liquid mixture is transferred to an accumulation zone by pressuring until the pressure in the primary chilling vessel is reduced to 5 p.s.i.g.

The table below presents material quantities applicable to the illustrated process. Flow line numerals correspond to those used in FIGURE 1.

TABLE I.—QUANTITIES PER BATCH

| | Flow stream component | | | | | |
| --- | --- | --- | --- | --- | --- | --- |
| | 11 | 13 | 14 | 16 | 17 | 18 | 19 |
| Lube oil (lbs.) | 17,500 | | | 17,500 | | | 17,500 |
| Propane (lbs.) | 19,600 | | 4,630 | 14,970 | 21,000 | 14,100 | 26,500 |
| Total (lbs.) | 37,100 | | 4,630 | 32,470 | 21,000 | 14,100 | 44,000 |
| Propane/oil | 1.90 | | | 1.46 | | | 2.60 |

The chilled liquid mixture discharged through line 19 contains 15 weight percent wax crystals. Thus, it can be seen that 14,100 pounds of liquid propane at 0° F. are required to chill 17,500 pounds of liquid mixture from 100° F. to −30° F. A conventional system using a single chilling vessel would require approximately 20,000 pounds of propane at 0° F. to so chill the same amount of the liquid mixture.

*Example II*

The chilling cycle described above is further illustrated by FIGURE 2 which shows the temperature of the preliminary and primary chilling vessels during the cycle.

Preliminary chiller is empty at 50° F., point 1. During the filling of the vessel with propane-wax-oil solution having a temperature of 100° F., the temperature of the vessel is raised, line 2. An equilibrium temperature of 85°, point 3, is reached. During the same time period, the primary chiller has cooled a batch of partially cooled propane-wax-oil solution from a temperture of 44° F., point 4, to −30° F., point 5, and the chilled propane-wax-oil solution at −30° F. has been removed, point 6.

Once the primary cooler is emptied, propane vapors are evaporated from the propane-wax-oil solution at 85°, in the preliminary chiller, point 3, until the mixture is cooled to 50° F., point 7. During the preliminary refrigeration, the cold primary chiller accepts the propane vapors and its temperature is raised from −30° F., point 6, to 40° F., point 8. The partially cooled propane-wax-oil solution is then transferred to the primary vessel and an equilibrium temperature of 44° F., point 9, is attained. The preliminary chiller is empty with a temperature of 50°, point 10, and the primary chiller contains a liquid mixture at 44° F., point 9; the cycle is then repeated.

Reasonable modifications and variations are within the scope of this invention which sets forth a novel process for chilling liquid mixtures.

That which is claimed is:

1. A method of chilling a liquid mixture comprising the steps of:
   charging a first amount of mixture to a preliminary chilling zone;
   chilling the mixture in said preliminary zone to an intermediate temperature by evaporization of a volatile component;
   transferring volatile component vapors from said preliminary zone to a lower pressure primary chilling zone, thereby reducing the temperature differential between said preliminary zone and said primary zone;
   transferring liquid mixture from said preliminary zone to said primary zone when said temperature differential has reached a desirable low value;
   chilling the liquid in said primary zone to a desired temperature to accomplish a desired crystallization;
   discharging the chilled liquid containing a crystallized component to an accumulation zone; and
   repeating the above steps in said first preliminary zone and said first primary zone.

2. The process of claim 1 wherein liquid mixture is charged to said preliminary chilling zone while liquid mixture is chilling in said primary chilling zone; and wherein liquid mixture is chilling in said preliminary chilling zone while the temperature in said primary chilling zone is being raised.

3. The process of claim 1 wherein two pairs of chilling zones, a first preliminary and a first primary zone and a second preliminary and a second primary zone, are utilized, said first preliminary zone being charged with liquid mixture while said second preliminary zone is being chilled by evaporation of volatile component, and said first primary zone being chilled while said second primary zone is being warmed by component vapors.

4. The process of claim 1 wherein the liquid mixture is a propane-oil-wax mixture.

5. The process of claim 1 wherein chilling in the primary chilling zone is accomplished by charging a volatile liquid refrigerant into the liquid mixture and evaporating the refrigerant, which includes the steps of removing the refrigerant vapors, repressuring, condensing and recycling.

6. The process of claim 5 wherein the liquid mixture is a propane-wax-oil solution, the volatile component is propane and the refrigerant is propane.

7. The process of claim 1 wherein a portion of the volatile component of the mixture is recycled to said preliminary chilling zone.

8. The process of claim 1 wherein a portion of the volatile component is recycled and added to the liquid mixture before charging the mixture to said preliminary chilling zone.

References Cited

UNITED STATES PATENTS

| | | | |
|---|---|---|---|
| 1,977,055 | 10/1934 | McGill et al. | 62—58 XR |
| 2,038,624 | 4/1936 | Adams et al. | 196—14.5 |
| 2,167,340 | 7/1939 | Thiele | 62—58 XR |
| 2,614,065 | 10/1952 | Wanderer et al. | |

NORMAN YUDKOFF, *Primary Examiner.*

V. W. PRETKA, *Assistant Examiner.*

U.S. Cl. X.R.

196—14.5